United States Patent
Lin

(10) Patent No.: US 10,972,003 B2
(45) Date of Patent: Apr. 6, 2021

(54) CHARGE PUMP

(71) Applicant: SITRONIX TECHNOLOGY CORP., Jhubei (TW)

(72) Inventor: Sheng-Ying Lin, Jhubei (TW)

(73) Assignee: Sitronix Technology Corp., Jhubei (TW)

(*) Notice: Subject to any disclaimer, the term of this patent is extended or adjusted under 35 U.S.C. 154(b) by 0 days.

(21) Appl. No.: 16/454,272

(22) Filed: Jun. 27, 2019

(65) Prior Publication Data

US 2020/0161968 A1    May 21, 2020

Related U.S. Application Data

(60) Provisional application No. 62/690,484, filed on Jun. 27, 2018.

(51) Int. Cl.
   *G05F 3/02*   (2006.01)
   *H02M 3/07*   (2006.01)
   *H02M 1/44*   (2007.01)

(52) U.S. Cl.
   CPC ............ *H02M 3/073* (2013.01); *H02M 1/44* (2013.01)

(58) Field of Classification Search
   CPC ................................ H02M 3/073; H02M 1/44
   USPC ............................................................ 327/536
   See application file for complete search history.

(56) References Cited

U.S. PATENT DOCUMENTS

| | | | | |
|---|---|---|---|---|
| 5,973,944 A * | 10/1999 | Nork | ............. | H02M 1/44 307/110 |
| 6,226,193 B1 * | 5/2001 | Bayer | ............. | H02M 3/07 363/59 |
| 7,612,603 B1 * | 11/2009 | Petricek | ............. | H02M 3/07 307/109 |
| 7,995,364 B2 * | 8/2011 | Shiu | ............. | H02M 3/07 363/124 |
| 9,906,126 B2 * | 2/2018 | Marsili | ............. | H02M 3/07 |
| 10,305,377 B2 * | 5/2019 | Cherniak | ............. | H02M 3/07 |
| 2002/0051372 A1 * | 5/2002 | Hoshino | ............. | H02M 3/07 363/60 |

(Continued)

FOREIGN PATENT DOCUMENTS

| CN | 1429424 A | 7/2003 |
|---|---|---|
| CN | 101656472 A | 2/2010 |

(Continued)

OTHER PUBLICATIONS

Office Action for corresponding International Application 201910568401.X dated Dec. 10, 2020.

*Primary Examiner* — Ryan Jager
(74) *Attorney, Agent, or Firm* — Rosenberg, Klein & Lee

(57) ABSTRACT

The charge pump is provided, which comprises a power supply circuit and a frequency control circuit. The power supply circuit comprises at least one electric energy storage element, and charges the at least one electric energy storage element for producing a supply voltage. The frequency control circuit is coupled to the at least one electric energy storage element, and outputs an operating signal to the power supply circuit. The frequency control circuit adjusts, an operating frequency of the operating signal in according to the electricity stored in the at least one electric energy storage element for controlling charging of the at least one electric energy storage element to increase the electricity of the at least one electric energy storage element.

11 Claims, 12 Drawing Sheets

(56) References Cited

U.S. PATENT DOCUMENTS

| | | | |
|---|---|---|---|
| 2007/0018700 A1* | 1/2007 | Yen | H02M 3/07 327/156 |
| 2008/0018382 A1* | 1/2008 | Nagatomo | H02M 3/07 327/536 |
| 2008/0094128 A1* | 4/2008 | Ito | H02M 3/07 327/536 |
| 2008/0197898 A1 | 8/2008 | Lin et al. | |
| 2009/0015211 A1 | 1/2009 | Ribellino et al. | |
| 2009/0027022 A1* | 1/2009 | Oyama | H02M 3/07 323/282 |
| 2009/0121782 A1* | 5/2009 | Oyama | H02M 3/07 327/536 |
| 2010/0156369 A1 | 6/2010 | Kularatna et al. | |
| 2011/0227633 A1* | 9/2011 | Mo | H02M 3/07 327/517 |
| 2016/0142046 A1 | 5/2016 | Powell | |
| 2017/0300078 A1 | 10/2017 | Puggelli et al. | |

FOREIGN PATENT DOCUMENTS

| | | |
|---|---|---|
| CN | 102761244 A | 10/2012 |
| CN | 104734494 A | 6/2015 |
| CN | 106341041 A | 1/2017 |
| CN | 106575919 A | 4/2017 |
| CN | 107276395 A | 10/2017 |
| CN | 107294376 B | 8/2020 |
| TW | 200644438 A | 12/2006 |
| TW | 201244344 A1 | 11/2012 |

\* cited by examiner

CHARGE PUMP

FIELD OF THE INVENTION

The present invention relates generally to a charge pump, and particularly to a charge pump capable of automatically controlling an operating frequency of the charge pump.

BACKGROUND OF THE INVENTION

A charge pump is a DC-to-DC converter used for producing an output voltage greater than the input voltage, or producing a negative output voltage. The principle of a charge pump is charging and discharging a capacitor(s). Different connection methods can be adopted, including charging parallelly, discharging serially, charging serially, and discharging parallelly, for achieving voltage conversion functions such as boost conversion, buck conversion, and negative conversion. A general charge pump needs to receive operating signals from the outside and the operating frequency of the operating signals is a fixed operating frequency. To achieve higher driving capability for loads, the fixed operating frequency of a charge pump is set higher. Nonetheless, as the load is changed form a heavy load to a light one, the proportion of the internal power consumption of the charge pump is increased apparently, leading to unnecessary power loss. In addition, to adjust the output voltage of the charge pump, the transmission of operating signals to the charge pump will normally be paused. Unfortunately, using this method, when the load is changing, significant voltage ripples will result since the operating signals cannot rapidly control the response of the charge pump.

Accordingly, the present invention provides a charge pump capable of automatically controlling the operating frequency. According to the load, the charge pump generates a power-saving operating frequency according to the internal state of the charge pump. Besides, the charge pump according to the present invention owns the characteristics of small output voltage ripples and rapid response.

SUMMARY

An objective of the present invention is to provide a charge pump capable of automatically controlling the operating frequency and hence reducing the electromagnetic interference in operation.

The present invention provides a charge pump, which comprises a power supply circuit and a frequency control circuit. The power supply circuit comprises at least one electric energy storage element, which is charged by the power supply circuit for producing a supply voltage. The frequency control circuit is coupled to electric energy storage element and outputs an operating signal to the power supply circuit. The frequency control circuit adjusts an operating frequency of the operating signal according to the stored electricity of the electric energy storage element for controlling the charging of the electric energy storage element and thus increasing the stored electricity.

DETAILED DESCRIPTION

In the specifications and subsequent claims, certain words are, used for representing specific elements. A person having ordinary skill in the art should know that hardware manufacturers might use different nouns to call the same element. In the specifications and subsequent claims, the differences in names are not used for distinguishing elements. Instead, the differences in functions are the guidelines for distinguishing. In the whole specifications and subsequent claims, the word "comprising" is an open language and should be explained as "comprising but not limited to". Besides, the word "couple" includes any direct and indirect electrical connection. Thereby, if the description is that a first element is coupled to a second element, it means that the first element is connected electrically to the second element directly, or the first element is connected electrically to the second element via other element or connecting means indirectly.

In order to make the characteristics as well as the effectiveness of the present invention to be further understood and recognized, the detailed description of the present invention is provided as follows along with embodiments and accompanying figures.

Figure 1:
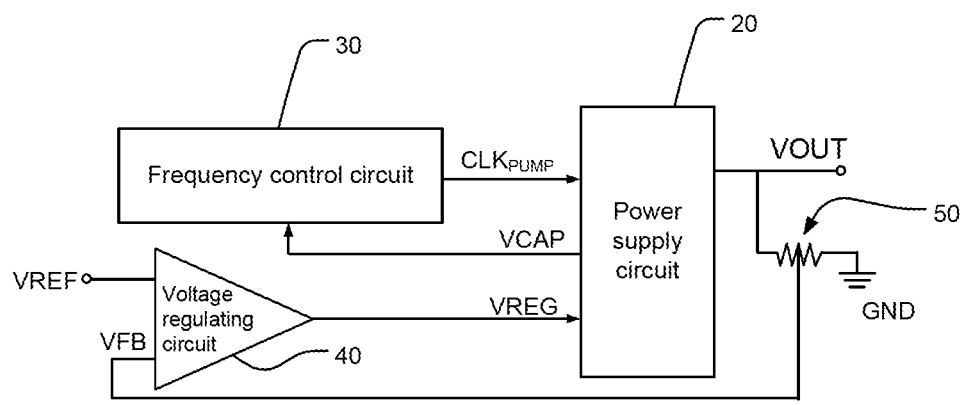
FIG. 1 shows a circuit diagram of the charge pump according to the first embodiment of the present invention.

Please refer to FIG. 1, which shows a circuit diagram of the charge pump according to the first embodiment of the present invention. As shown, in the figure, the charge pump 10 comprises a power supply circuit 20 and a frequency control circuit 30. The frequency control circuit 30 is coupled to the power supply circuit 20 for receiving a detecting signal VCAP, and outputting an operating signal $CLK_{PUMP}$ to the power supply circuit 20 according to the detecting signal VCAP. The operating signal $CLK_{PUMP}$ is a clock signal. The power supply circuit 20 outputs a supply voltage VOUT. In addition, the charge pump 10 further comprises a voltage regulating circuit 40, which includes a first input terminal and a second input terminal. The first input terminal is coupled to an output terminal of the charge pump 10; the second input terminal is coupled to a reference voltage VREF. Thereby, the voltage regulating circuit 40 generates a voltage regulating signal VREG according to the supply voltage VOUT and the reference voltage VREF. The power supply circuit 20 is coupled to the voltage regulating circuit 40 and receives the voltage regulating signal VREG.

Besides, the voltage regulating circuit 40 may be coupled to the output terminal of the charge pump 10 via an impedance element 50.

Figure 2:
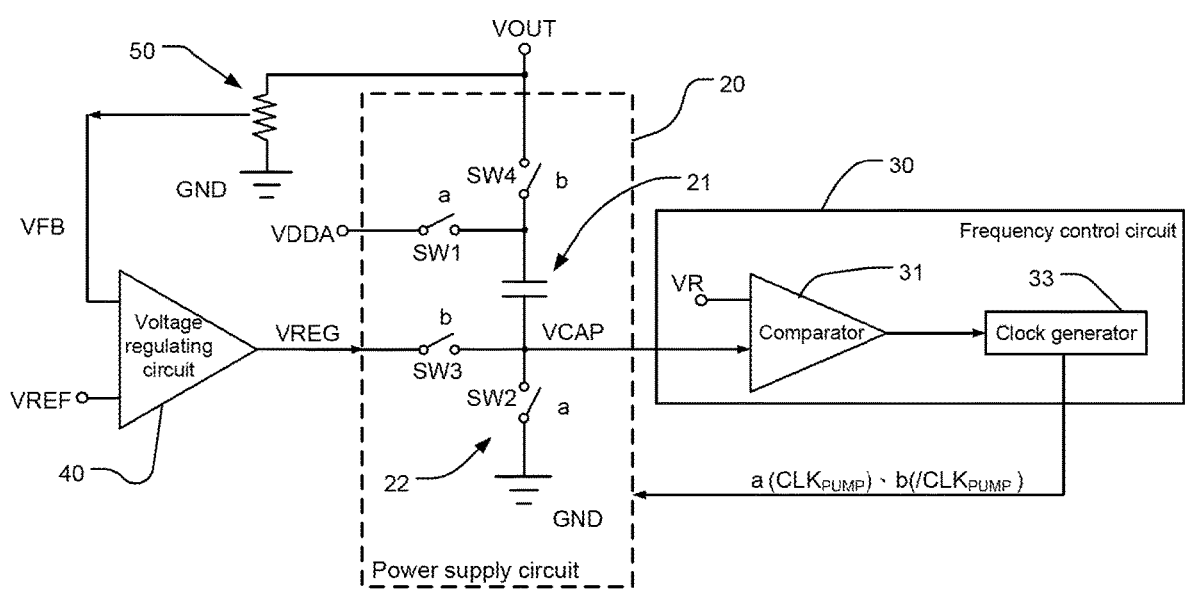
FIG. 2 shows a circuit diagram of the power supply circuit according to the first embodiment of the present invention.

Please refer to FIG. 2, which shows a circuit diagram of the power supply circuit according to the first embodiment of the present invention. As shown in the figure, the power supply circuit 20 includes at least one electric energy storage element 21, and outputs the supply voltage VOUT by the electricity stored in the electric energy storage element 21. In addition, the power supply circuit 20 includes a switching circuit 22, which is coupled to the electric energy storage element 21 and turns on or off a charging path or a discharging path for the electric energy storage element 21. The switching circuit 22 includes four switches SW1, SW2, SW3, SW4 controlled by a plurality of switching signals a, b. The switching signals a, b are generated according to the operating signal $CLK_{PUMP}$. For example, a clock generator 33 generates the switching signal a or the switching signal b according to the operating signal $CLK_{PUMP}$. Besides, the switching signals a, b may be inverse signals to each other. In other words, the switching signal b is equivalent to the operating signal $CLK_{PUMP}$ while the switching signal a is the inverse of the operating signal $CLK_{PUMP}$. The clock generator 33 controls the timing of the high and low levels of the switching signals a, b. That is to say, the clock generator 33 determines the turn-on and turn-off times of the switching signals a, b. Thereby, when the frequency control circuit 30 increases or decreases the operating frequency of the operating signal $CLK_{PUMP}$, the charging or discharging frequency of the electric energy storage element 21 is increased or reduced correspondingly. Hence, the charging and discharging frequencies may be equal to or related to the operating frequency. Moreover, the power supply circuit 20 outputs the supply voltage VOUT by the electricity stored in the electric energy storage element 21.

As the level of the switching signal a is high level and the level of the switching signal b is low level, the switching signal a controls the two switches SW1, SW2 to turn on for forming a charging path while the switching signal b controls the other two switches SW3, SW4 to turn off. Thereby, a charging voltage VDDA charges the electric energy storage element 21 through the charging path. The electric energy storage element 21 is coupled between the charging voltage VDDA and a ground terminal GND. As the level of the switching signal a is low level and the level of the switching signal b is high level, the switching signal a controls the two switches SW1, SW2 to turn off while the switching signal b controls the other two switches SW3, SW4 to turn on for forming a discharging path. Thereby, the voltage regulating signal VREG generated by the voltage regulating circuit 40 is transmitted to the electric energy storage element 21. The power supply circuit 20 outputs the supply voltage VOUT according to the voltage regulating signal VREG and the electricity of the electric energy storage element 21.

As shown in FIG. 2, the electric energy storage element 21 may be a capacitor. Hence, when the switches SW1, SW2 are turned on to form the charging path, the level of both terminals of the electric energy storage element 21 are the level of the charging voltage VDDA and the level of the ground terminal GND, respectively; when the switches SW3, SW4 are turned on to form the discharging path, the level of both terminals of the electric energy storage element 21 are the level of the supply voltage VOUT and the level of the voltage regulating signal VREG, respectively. The electric energy storage element 21 includes a first electrode terminal and a second electrode terminal. The first electrode terminal is coupled to the charging voltage VDDA and an output terminal of the power supply circuit 20 via the switching circuit 22 (the switches SW1, SW4); the second electrode terminal is coupled to the switching circuit 22 and the frequency control circuit 30. The second electrode terminal is coupled to the ground terminal GND and the voltage regulating circuit 40 via the switching circuit 22 (the switch SW2). Thereby, when the charging voltage VDDA charges the electric energy storage element 21, the power supply circuit 20 stops outputting the supply voltage VOUT.

Figure 3:
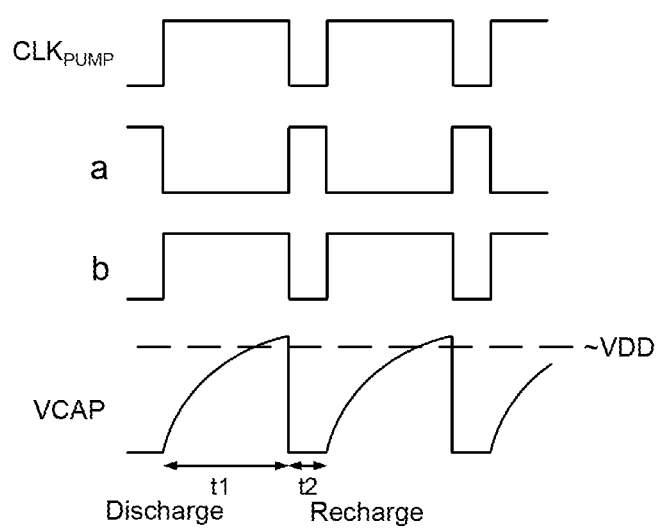
FIG. 3 shows waveforms of the detecting signal regarding electricity storage in FIG. 2.

Please refer to FIG. 2 and FIG. 3, FIG. 3 shows waveforms of the detecting signal regarding electricity storage in FIG. 2. As shown in the figures, before the period t1, the level of the switching signal a is high level and the level of the switching signal b is low level. Thereby, the switches SW1, SW2 are turned on; the charging voltage VDDA charges the electric energy storage element 21, and the level of the detecting signal VCAP is at the level of the ground terminal GND. Within the period t1, namely, the discharging period of the electric energy storage element 21, the level of the switching signal a is low level and the level of the switching signal b is high level. Thereby, the switches SW3, SW4 are turned on; the power supply circuit 20 starts to output the supply voltage VOUT according to the electricity of the electric energy storage element 21. Since the load connected to the charge pump 10 consumes the electricity of the electric energy storage element 21, the electricity of the electric energy storage element 21 will decrease gradually. At this moment, the voltage regulating circuit 40 detects the supply voltage VOUT and generates the voltage regulating signal VREG according to the level of the supply voltage VOUT. In other words, while the voltage regulating circuit 40 compares a feedback voltage VFB with a reference voltage VREF for detecting if the electricity is insufficient for the load. If the electricity of the electric energy storage element 21 is insufficient, the voltage regulating signal VREG generated by the voltage regulating circuit 40 will compensate the electricity deficiency of the electric energy storage element 21.

Accordingly, in the period t1, the electricity of the electric energy storage element 21 is decreased gradually and the level of the voltage regulating signal VREG is increased gradually, making the level of the detecting signal VCAP increase gradually as well. As the level of the detecting signal VCAP is increased to a compensation upper limit, the electric energy storage element 21 will recharge. The compensation upper limit is related to the compensation capability of the voltage regulating circuit 40. According to the embodiment in FIG. 3, the compensation upper limit is set to be an upper-limit voltage VDD. Thereby, when the level of the detecting signal VCAP is increased to around the level of the upper-limit voltage VDD (~VDD), the electric energy storage element 21 enters the charging period, namely, the period t2. The level of the switching signal a is high level and the level of the switching signal b is low level again. The charging voltage VDDA recharges the electric energy storage element 21 and the level of the detecting signal VCAP is changed to the level of the ground terminal GND. Because the voltage regulating circuit 40 detects the supply voltage VOUT and compensates the electricity deficiency of the electric energy storage element 21 rapidly, the supply voltage VOUT output by the charge pump 10 according to the present invention has smaller ripples and rapid responses. Besides, the voltage regulating circuit 40 may be an error amplifier.

The level of the detecting signal VCAP changes according to the level of the voltage regulating signal VREG, and the level of the voltage regulating signal VREG changes according to the electricity (or the variation of the electricity) stored in the electric energy storage element 21. Thereby, the level of the detecting signal VCAP changes according to the variation of the electricity stored in the electric energy storage element 21. The detecting signal VCAP is transmitted to the frequency control circuit 30. Hence, the frequency control circuit 30 adjusts the operating frequency of the operating signal $CLK_{PUMP}$ according to the variation of the electricity stored in the electric energy storage element 21. According to different embodiments of the circuit, if the charge pump 10 does not comprise the voltage regulating circuit 40, the frequency control circuit 30 may adjust the operating frequency of the operating signal $CLK_{PUMP}$ directly according to the variation of the electricity stored in the electric energy storage element 21.

The frequency control circuit 30 may include a comparator 31, which is coupled to the clock generator 33 and outputs a comparison signal to the clock generator 33. The comparator 31 is coupled to a regulating threshold voltage VR and the detecting signal VCAP. So, during the discharging period, the comparator 31 is coupled to the regulating threshold voltage VR and the voltage regulating signal VREG generated by the voltage regulating circuit 40. The comparator 31 compares the regulating threshold voltage VR with the voltage regulating signal VREG to generate the comparison signal during the discharging period. Then the frequency control circuit 30 generates the operating signal $CLK_{PUMP}$ according to the comparison signal. The operating frequency of the operating signal $CLK_{PUMP}$ is related to the frequency of the comparison signal. In addition, the regulating threshold voltage VR is related to the compensation capability of the voltage regulating circuit 40. Namely, the level of the regulating threshold voltage VR may be equal to or related to the level of the upper-limit voltage VDD. Alternatively, it may be related to the level of the upper-limit voltage VDD. For example, the level of the regulating threshold voltage VR is set to be 90% of the level of the upper-limit voltage VDD. Thereby, the frequency control circuit 30 may detect if the output of the voltage regulating circuit 40 is close to the upper limit of its compensation capability, namely, detect if the electricity stored in the electric energy storage element 21 is close to the lower limit thereof, for controlling the electric energy storage element 21 to be recharged.

As shown in FIG. 3, when the detecting signal VCAP is increased around the upper-limit voltage VDD, the comparator 31 of the frequency control circuit 30 compares the detecting signal VCAP with, the regulating threshold. voltage VR to control the level of the comparison signal to become the low level. The frequency control circuit 30 may generate the operating signal $CLK_{PUMP}$ according to the comparison signal. Alternatively, without processing the comparison signal, the frequency control circuit 30 may output the comparison signal directly as the operating signal $CLK_{PUMP}$. Thereby, the levels of the switching signals a, b are changed to high and low levels according to the operating signal $CLK_{PUMP}$, or the levels of the switching signals a, b are changed to high and low levels according to the comparison signal. Hence, the electric energy storage element 21 is charged or discharged according to the switching signals a, b for increasing or decreasing the stored electricity. Namely, the electric energy storage element 21 is charged or discharged according to the operating signal $CLK_{PUMP}$ for increasing or decreasing the stored electricity. Alternatively, the electric energy storage element 21 is charged or discharged according to the comparison signal for increasing or decreasing the stored electricity.

Figure 4:
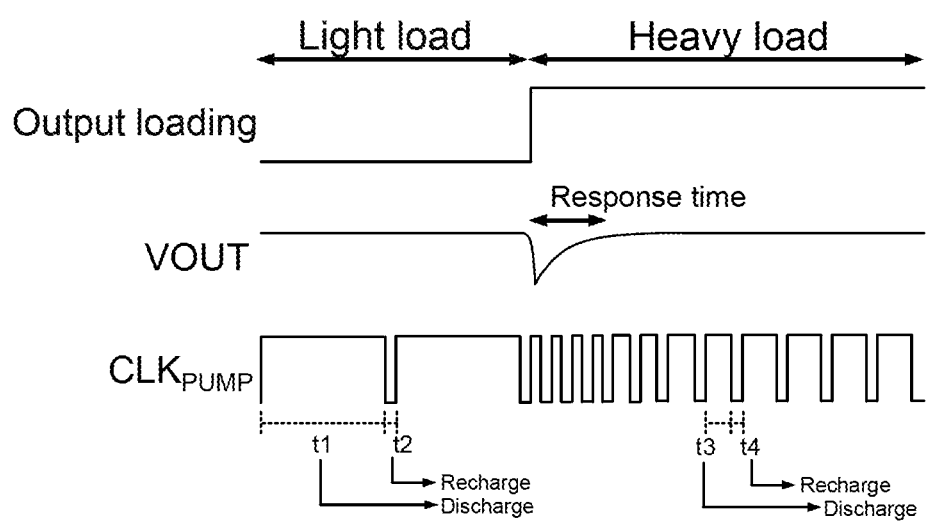
FIG. 4 shows waveforms of the operating signal regarding output load in FIG. 2.

Furthermore, the consumption rate of the electricity stored in the electric energy storage element 21 is related to the power demand of the load of the charge pump 10. FIG. 4 shows waveforms of the operating signal regarding output load in FIG. 2. When the output load is light load, the power demand is lower. Then the consumption rate of the electricity stored in the electric energy storage element 21 is slower, meaning that the discharging period of the electric energy storage element 21 is longer. Consequently, the level of the voltage regulating signal VREG generated by the voltage regulating circuit 40 is increased slower, and level of the detecting signal VCAP will be increased to the level around the level of the upper-limit voltage VDD at a slower rate. Thereby, as shown in FIG. 4, the period t1 in a light load period is longer than the period t3 in a heavy load period. In a heavy load period, the consumption rate of the electricity stored in the electric energy storage element 21 is faster.

Accordingly, if the consumption rate of the electricity stored in the electric energy storage element 21 is slow, it is slower for period of the electric energy storage element 21 to be entered to the charging period (the period t1 changed to the period t2); if the consumption rate of the electricity stored in the electric energy storage element 21 is fast, it is faster for period of the electric energy storage element 21 to be entered to the charging period (the period t3 changed to the period t4). The charging periods t2, t4 according to the embodiment in FIG. 4 may be fixed periods with the duration determined by the equivalent impedance, for example, the resistive impedance (R) and the capacitive impedance (C), of the electric energy storage element 21. Thereby, the frequency control circuit 30 controls the operating frequency of the operating signal $CLK_{PUMP}$ automatically according to the loading (light or heavy load) by detecting the internal state of the charge pump 10, for achieving the characteristic of quick response. As shown in FIG. 4, the operating frequency of the charge pump 10 for the light load is lower than the operating frequency for the heavy one. In other words, the operating frequency during the periods t1-t2 is lower than the one during the periods t3-t4. The operating frequency may be regarded as the charging frequency. Thereby, the charge pump 10 may produce the power-saving operating frequency and control the internal charging and discharging times without receiving multiple external signals with various frequencies or receiving an external signal with the adjustable frequency.

Please refer again to FIG. 4. When the output load is changed from the light load to the heavy one, the electricity stored in the electric energy storage element 21 after charging is consumed rapidly in a short time. The level of the detecting signal VCAP detected by the frequency control circuit 30 is increased rapidly to the level of the upper-limit voltage VDD. Thereby, the frequency control circuit 30 controls the level of the operating signal $CLK_{PUMP}$ to be the low level again in a short time and the electric energy storage element 21 is recharged again. Hence, in the response time for load transition, the operating frequency of the operating signal $CLK_{PUMP}$ is obviously higher than the operating frequencies in the light-load and heavy-load periods. When the power supply circuit 20 supplies stably the power required for the output load, the operating frequency of the operating signal $CLK_{PUMP}$ is changed to the operating frequency in the periods t3-t4. Thereby, the charge pump 10 may generate the operating signal $CLK_{PUMP}$ with multiple operating frequencies automatically by detecting the change rate of the electricity stored in the electric energy storage element 21, for achieving the characteristic of quick response to properly control the internal power consumption of the charge pump 10.

Figure 5:
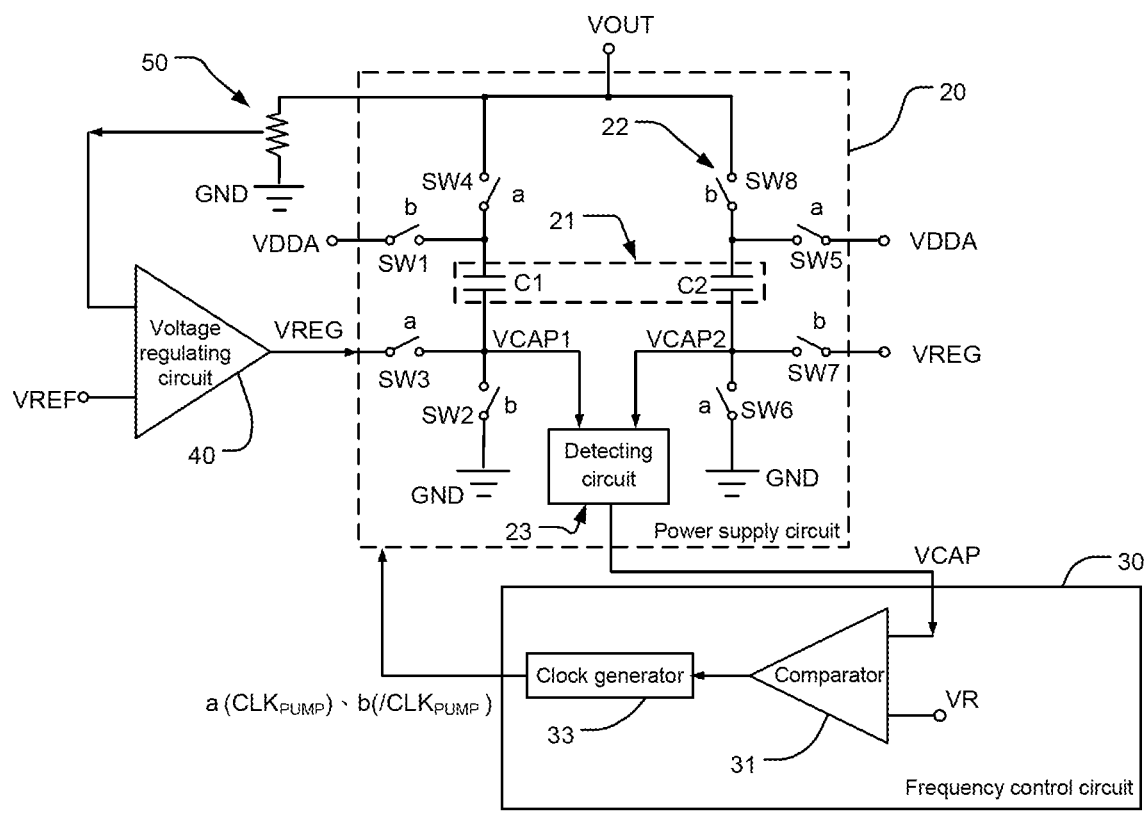
FIG. 5 shows a circuit diagram of the power supply circuit according to the second embodiment of the present invention.

Please refer to FIG. 5, which shows a circuit diagram of the power supply circuit according to the second embodiment of the present invention. As shown in the figure, the electric energy storage element 21 according to the embodiment shown in FIG. 2 is replaced by a first electric energy storage element C1 and a second electric energy storage element C2, which are coupled to the charging voltage VDDA, the ground terminal GND, the voltage regulating circuit 40 and the output terminal of the power supply circuit 20 through the switching circuit 22. Compared to the switching circuit 22 according to the embodiment shown in FIG. 2, the switching circuit 22 according to the embodiment shown in FIG. 5 includes four switches SW5, SW6, SW7, SW8 on the right side. Thereby, the state of the charging pump 10 may be changed from the single phase (either the charging or the discharging state) according to the embodiment shown in FIG. 2 to the dual phases (both the charging and the discharging states) according to the embodiment shown in FIG. 5. In other words, according to the embodiment shown in FIG. 2, the charge pump 10 stops outputting the supply voltage VOUT while charging the electric energy storage element 21. According to the embodiment shown in FIG. 5, when the charge pump 10 outputs the supply voltage VOUT according to the electricity in the first electric energy storage element C1 on the left side (i.e. the first electric energy storage element C1 is discharged), the second electric energy storage element C2 on the right side is charged; when the charge pump 10 outputs the supply voltage VOUT according to the electricity in the second electric energy storage element C2 on the right side (i.e. the second electric energy storage element C2 is discharged), the first electric energy storage element C1 on the left side is charged. Namely, when the power supply circuit 20 outputs the supply voltage VOUT according to the electricity in the second electric energy storage element C2, the charging voltage VDDA charges the first electric energy storage element C1; when the power supply circuit 20 outputs the supply voltage VOUT according to the electricity in the first electric energy storage element C1, the charging voltage VDDA charges the second electric energy storage element C2.

In addition, the charge pump 10 according to the embodiment shown in FIG. 5 further comprises a detection circuit 23, which is coupled to the frequency control circuit 30, the second electrode terminal of the first electric energy storage element C1, the second electrode terminal of the second electric energy storage element C2 and the voltage regulating signal VREG generated by the voltage regulating circuit 40 for detecting the voltage regulating signal VREG to generate the detecting signal VCAP to the frequency control circuit 30. The frequency control circuit 30 controls the operating frequency of the operating signal $CLK_{PUMP}$ according to the detecting signal VCAP generated by the detecting circuit 23. Please refer to FIG. 6, which shows a circuit diagram of the detection circuit according to an embodiment of the present invention. As shown in the figure, the detecting circuit 23 includes a first transistor TFT1 and a second transistor TFT2. The gate G1 of the first transistor TFT1 is coupled to a second input terminal IN2 and the source S2 of the second transistor TFT2; the source S1 of the first transistor TFT1 is coupled to a first input terminal IN1 and the gate G2 of the second transistor TFT2; and the drain D1 of the first transistor TFT1 is coupled to an output terminal OUT of the detecting circuit 23. The source S2 of the second transistor TFT2 is coupled to the second input terminal IN2; the drain D2 of the second transistor TFT2 is coupled to the output terminal OUT of the detecting circuit 23; and the gate G2 of the second transistor TFT2 is coupled to the first input terminal IN1. The detecting circuit 23 may be replaced by the counter and the switch. In other words, the counter counts the charging and discharging times of the electric energy storage element to change the state of the switch.

When the voltage level of the first input terminal IN1 is low level, it means that the first electric energy storage element C1 is charging; when the voltage level of the second input terminal IN2 is high level, it means that the second electric energy storage element C2 is discharging. Thereby, when the voltage level of the first input terminal IN1 is low level and the voltage level of the second input terminal IN2 is high level, the second transistor TFT2 is turned on and the first transistor TFT1 is turned off. Since the second transistor TFT2 is turned on, the level of the detecting signal VCAP is the voltage level of the second input terminal IN2. On the other hand, since the voltage level of the first input terminal IN1 is high level and the voltage level of the second input terminal IN2 is low level, the first transistor TFT1 is turned on and the second transistor TFT2 is turned off. Since the first transistor TFT1 is turned on, the level of the detecting signal VCAP is the voltage level of the first input terminal IN1.

Figure 6:
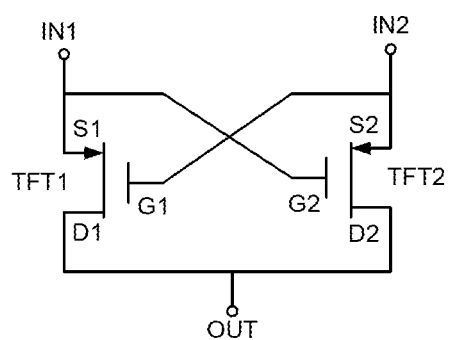
FIG. 6 shows a circuit diagram of the detection circuit according to an embodiment of the present invention.
Figure 7:
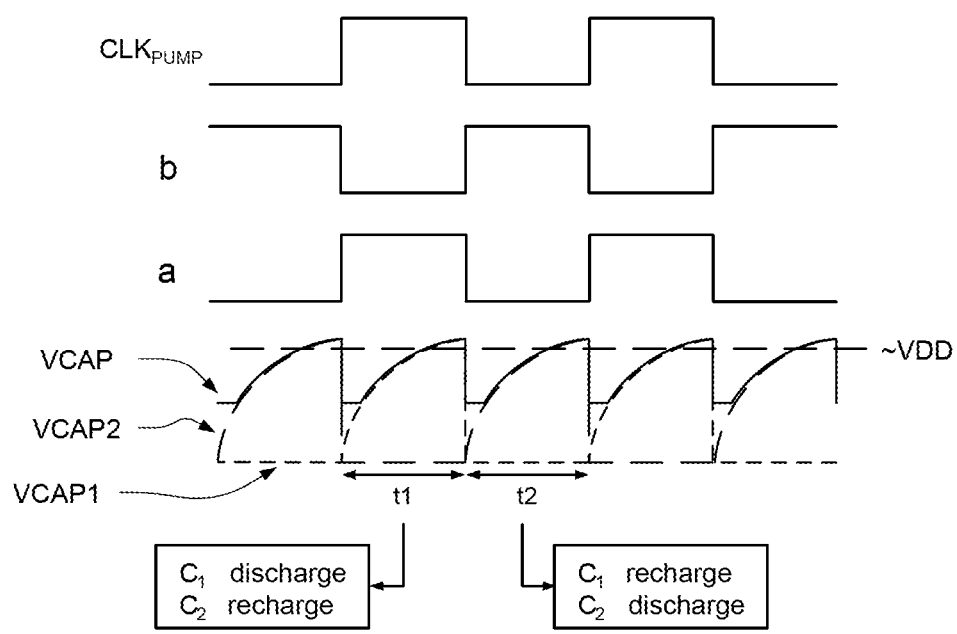
FIG. 7 shows waveforms of the detecting signal regarding electricity storage in FIG. 5.

Please refer to FIGS. 5, 6, and 7. FIG. 7 shows waveforms of the detecting signal regarding electricity storage in FIG. 5. As shown in FIG. 5, the first detecting signal VCAP1 is related to the electricity in the first capacitor C1 on the left side; the second detecting signal VCAP2 is related to the electricity in the second electric energy storage element C2 on the right side. In the period t1 of FIG. 7, the first capacitor C1 starts to discharge and the level of the first detecting signal VCAP1 starts to increase gradually; the second electric energy storage element C2 starts to be charged and the level of the second detecting signal VCAP2 is equal to the level of the ground terminal GND. Contrarily, in the period t2 of FIG. 7, the first capacitor C1 starts to be charged and the level of the first detecting signal VCAP1 is equal to the level of the ground terminal GND; the second electric energy storage element C2 starts to discharge and the level of the second detecting signal VCAP starts to increase gradually. Thereby, the charge pump 10 may operate in the dual phases (charging and discharging) in the same period (t1 or t2).

The rest technology content is the same as the description for FIG. 3. Hence, the details will not be described again.

Figure 8:
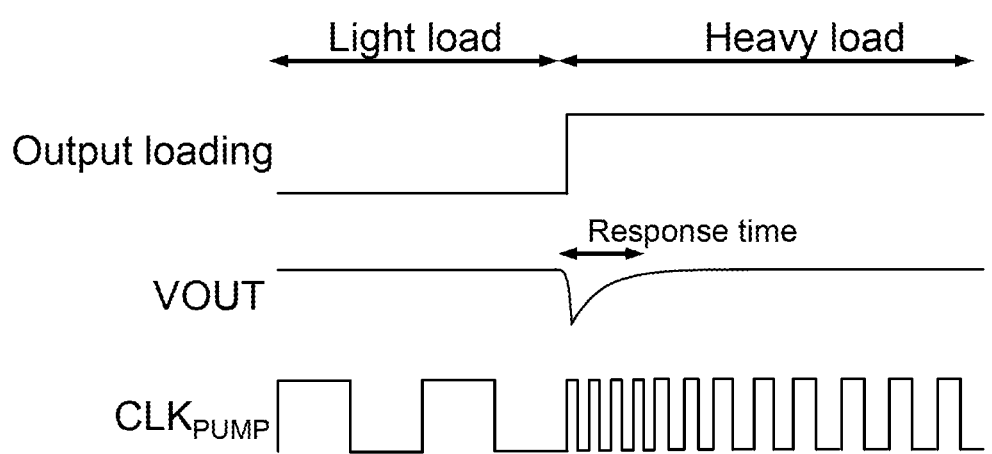
FIG. 8 shows waveforms of the operating signal regarding output load in FIG. 5.

Please refer to FIG. 8, which shows waveforms of the operating signal regarding output load in FIG. 5. As shown in the figure, the waveforms in FIG. 8 are similar to those in FIG. 4. The difference is that FIG. 4 shows waveforms of the single-phase charge pump 10 while FIG. 8 shows waveforms of the dual-phase charge pump 10. Thereby, in the light-load period shown in FIG. 8, the power requirement for output loading is the same as the power requirement in FIG. 4 and the consumption rate of the electricity in the electric energy storage element 21 is the same as the consumption rate in FIG. 4. Namely, the time for the level of the detecting signal VCAP to be increased around the level of the upper-limit voltage VDD will be the same. Consequently, the time for the level of the operating signal $CLK_{PUMP}$ to change from the high level to the low level or from the low level to the high level will be the same. In other words, according to the embodiment of the dual-phase, charge pump 10, after the first capacitor C1 (the second electric energy storage element C2) is charged, the state (high or low level) of the operating signal $CLK_{PUMP}$ cannot be changed until the electricity of the second electric energy storage element C2 (the first capacitor C1) is decreased below a certain level. The charging time of the first electric energy storage element C1 on the left side in FIG. 5 is approximately equal to the charging time of the second electric energy storage element C2 on the right side.

Figure 9:
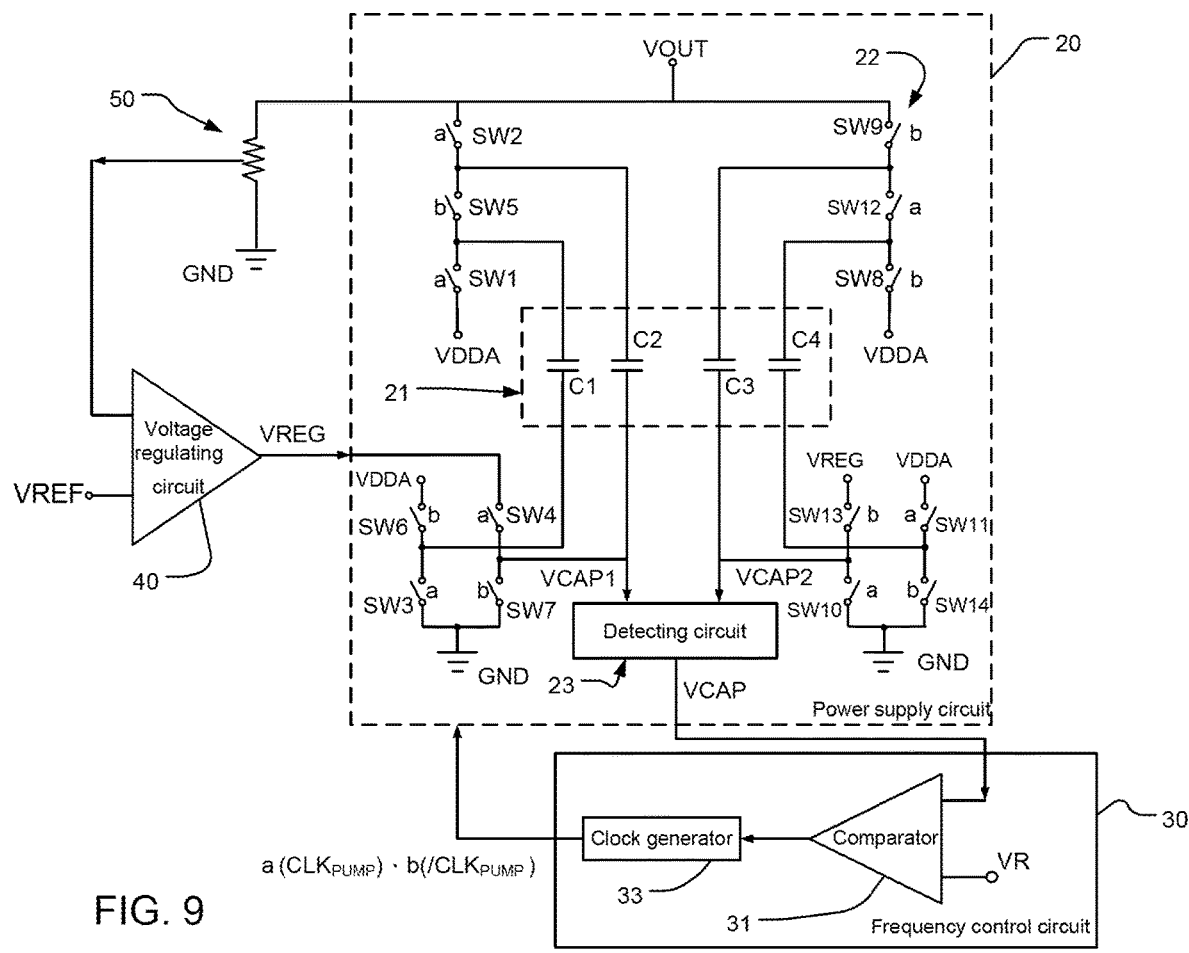
FIG. 9 shows a circuit diagram of the power supply circuit according to the third embodiment of the present invention.

Please refer to FIG. 9, which shows a circuit diagram of the power supply circuit according to the third embodiment of the present invention. As shown in the figure, the electric energy storage element 21 shown in FIG. 2 and FIG. 5 is replaced by the first electric energy storage element C1, the second electric energy storage element C2, a third electric energy storage element C3, and a fourth electric energy storage element C4. The four electric energy storage elements C1~C4 may be four capacitors C1~C4 coupled to the charging voltage VDDA, the ground terminal GND, the voltage regulating circuit 40 and an output terminal of the power supply circuit 20 through the switching circuit 22. The switching circuit according to the embodiment in FIG. 9 includes a plurality of switches SW1, SW2, SW3, SW4, SW5, SW6, SW7, SW8, SW9, SW10, SW11, SW12, SW13, SW14. Thereby, when the level of the switching signal a is high level and the level of the switching signal b is low level, the charging voltage VDDA charges the first electric energy storage element C1 on the left side; the second electric energy storage element C2 is discharged; and the charging voltage VDDA pulls up the level of the fourth electric energy storage element C4 (which is a double voltage of the charging voltage VDDA) on the right side by switching the switch SW11 for charging the third electric energy storage element C3. Hence, if the charging voltage VDDA is a unit voltage, the first electric energy storage elements C1 stores the electricity of the unit voltage, and the third electric energy storage elements C3 stores the electricity of the double voltage. In addition, when the level of the switching signal a is changed to low level and the level of the switching signal b is changed to high level, the charging voltage VDDA pulls up the level of the first electric energy storage element C1 by switching the switch SW6, for charging the second electric energy storage element C2; the voltage regulating signal VREG pulls up the level of the third electric energy storage element C3 by switching the switch SW13, and the third electric energy storage element C3 is discharged; and the charging voltage VDDA charges the fourth electric energy storage element C4. The second electric energy storage element C2 stores electricity at double the unit voltage.

Accordingly, when the level of the switching signal a recovers to high level and the level of the switching signal b recovers to low level, the voltage regulating signal VREG pulls up the level of the second electric energy storage element C2, and the second electric energy storage element C2 is discharged, generating the supply voltage VOUT according to the voltage regulating signal VREG and the electricity in the second electric energy storage element C2. According to the embodiment shown in FIG. 9, the maximum level of the supply voltage VOUT may be triple the unit voltage. That is, double the charging voltage VDDA plus the voltage (unit voltage) of the voltage regulating signal VREG. Therefore, by the operation of the charge pump 10, the supply voltage VOUT may be triple the unit voltage as the same according to the third electric energy storage element C3 and the voltage regulating signal VREG. Hence, when the power supply circuit 20 outputs the supply voltage VOUT according to the electricity in the second electric energy storage element C2, the charging voltage VDDA charges the first electric energy storage element C1, and pulls up the level of the fourth electric energy storage element C4 to charge the third electric energy storage element C3; when the power supply circuit 20 outputs the supply voltage VOUT according to the electricity in the third electric energy storage element C3, the charging voltage VDDA pulls up the level of the first electric energy storage element C1 to charge the second electric energy storage element C2, and also charges the fourth electric energy storage element C4. According to the embodiment shown in FIG. 9, the charge pump 10 according to the embodiments shown in FIG. 2 and FIG. 5 may output the supply voltage VOUT at double the unit voltage.

Figure 10:
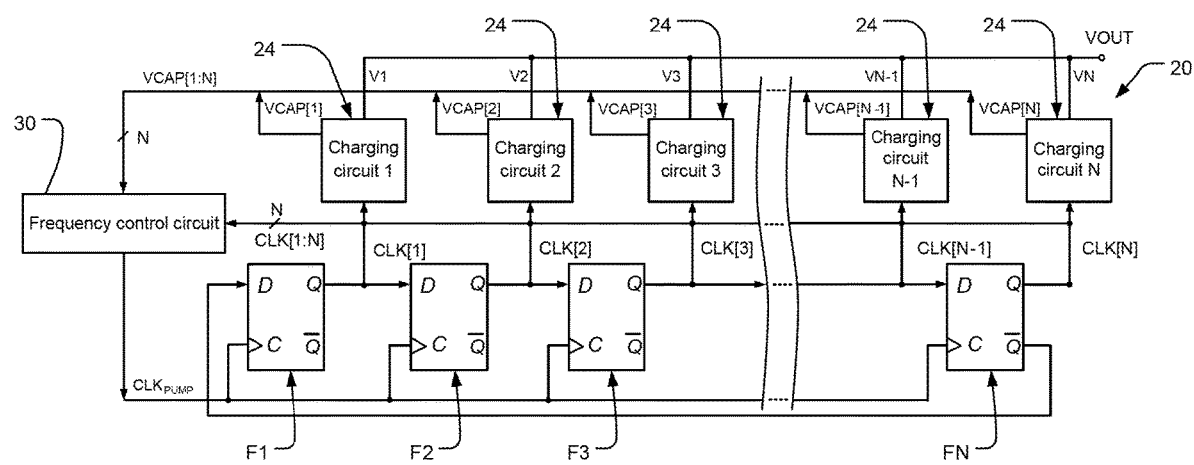
FIG. 10 shows a circuit diagram of the charge pump according to the second embodiment of the present invention.

Please refer to FIG. 10, which shows a circuit diagram of the charge pump according to the second embodiment of the present invention. As shown in the figure, the power supply circuit 20 may be one single-phase or dual-phase circuit, as shown in FIGS. 2, 5, and 9. Alternatively, it may be multiple single-phase or dual-phase circuits, as shown in FIG. 10. In other words, the power supply circuit 20 includes a plurality of charging circuits 24, which are coupled to a plurality of control signals CLK[1], CLK[2], CLK[3] . . . CLK[N-1], CLK[N] generated by the frequency control circuit 30 and an output terminal of the power supply circuit 20, respectively. The charging circuits 24 produce a plurality of output voltages V1, V2, V3 . . . VN-1, VN according to the control signals CLK[1~N]. The power supply circuit 20 produces the supply voltage VOUT according to the output voltages V1~VN. The charging circuits 24 generates a plurality of detecting signals VCAP[1], VCAP[2], VCAP[3] . . . VCAP[N-1], VCAP[N] to the frequency control circuit 30, which modulates the control signals CLK[1~N] according to the detecting signals VCAP[1~N]. Each of the charging circuits 24 according to the embodiment shown in FIG. 10 may be the power supply circuit 20 according to the embodiments shown in FIGS. 2, 5 and 9. Hence, the technology contents of the charging circuits 24 will not be described again. The frequency control circuit 30 receives the detecting signals VCAP[1~N] and the control signals CLK[1~N] through multiple transmission lines.

Besides, the charge pump 12 further comprises a plurality of flip-flops F1, F2, F3 . . . FN, which, like the clock generator 33 as described above, control the switching timing of the charging circuits 24. According to the present embodiment, the flop-flops F[1~N] may be a multi-phases generator, based on a multi-phases generator of Johnson counters. The flop-flops F[1~N] include a plurality of input terminals D, a plurality of output terminals Q, a plurality of inverse output terminals /Q, and plurality of control terminals C. The input terminal D of the first stage flop-flop F1 of the flop-flops F[1~N] is coupled to the inverse output terminal /Q of the last stage flop-flop FN. The output terminals Q and the input terminals D of the flip-flops F2, F3 . . . F[N-1] between the first-stage flip-flop F1 and the last-stage flip-flop FN are connected serially and sequentially. The control terminals C are coupled to the operating signal $CLK_{PUMP}$, which controls the flip-flops F[1~N] to output a pulse signal to the next stage flop-flop. The flip-flops F[1~N] generate the control signals CLK[1~N] according to the pulse signals.

Accordingly, the first-stage flip-flop F1 outputs the pulse signal to the second-stage flip-flop F2. In addition, the pulse signal output by the first-stage flip-flop F1 is used as the control signal CLK[1] of the first-stage charging circuit (1) 24. Thereby, the first-stage charging circuit (1) 24 charges or discharges according to the control signal CLK[1]. Besides, after the first-stage charging circuit (1) 24 is discharged, the second-stage flip-flop F2, in turn, outputs the pulse signal as the control signal CLK[2] to the third-stage flip-slop F3. The second-stage charging circuit (2) 24 discharges according to the control signal CLK[2]. In this manner, the operating signal $CLK_{PUMP}$ may control the charging and discharging of each of the charging circuits 24 sequentially through the flip-flops F[1~N]. Since the charging circuit 24 in the charge pump 12 does not change states simultaneously, namely, the charging/discharging state of the charging circuit 24 is not changed simultaneously, the electromagnetic interference may be reduced.

Moreover, the flip-flops F[1~N] may be disposed within the frequency control circuit 30. That is to say, the frequency control circuit 30 outputs the control signals CLK[1~N] to control the charging and discharging of each of the charging circuits 24.

Figure 11:
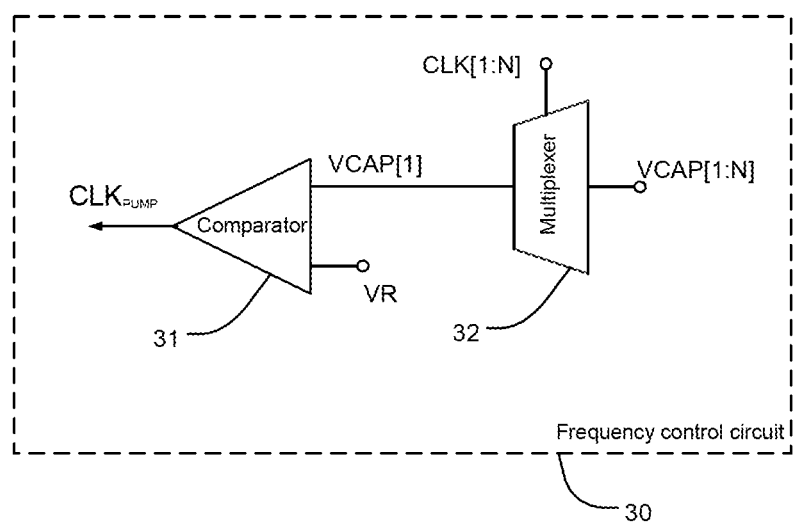
FIG. 11 shows a circuit diagram of the frequency control circuit according to an embodiment of the present invention.

Please refer to FIG. 11, which shows a circuit diagram of the frequency control circuit according to an embodiment of the present invention. As shown in the figure, the frequency control circuit 30 further includes a multiplexer 32. The multiplexer 32 receives the control signals CLK[1~N] and the detecting signals VCAP[1~N], and outputs one of the detecting signals VCAP[1~N] according to the control signals CLK[1~N], for example, the detecting signal VCAP[1]. Namely, the charge pump 12 may identify which charging circuit 24 supplies the electricity according to the control signals CLK[1~N] for outputting the supply voltage VOUT. Thereby, the frequency control circuit 30 output the operating signal $CLK_{PUMP}$ for controlling the charging and discharging of the charging circuits 24.

Figure 12:
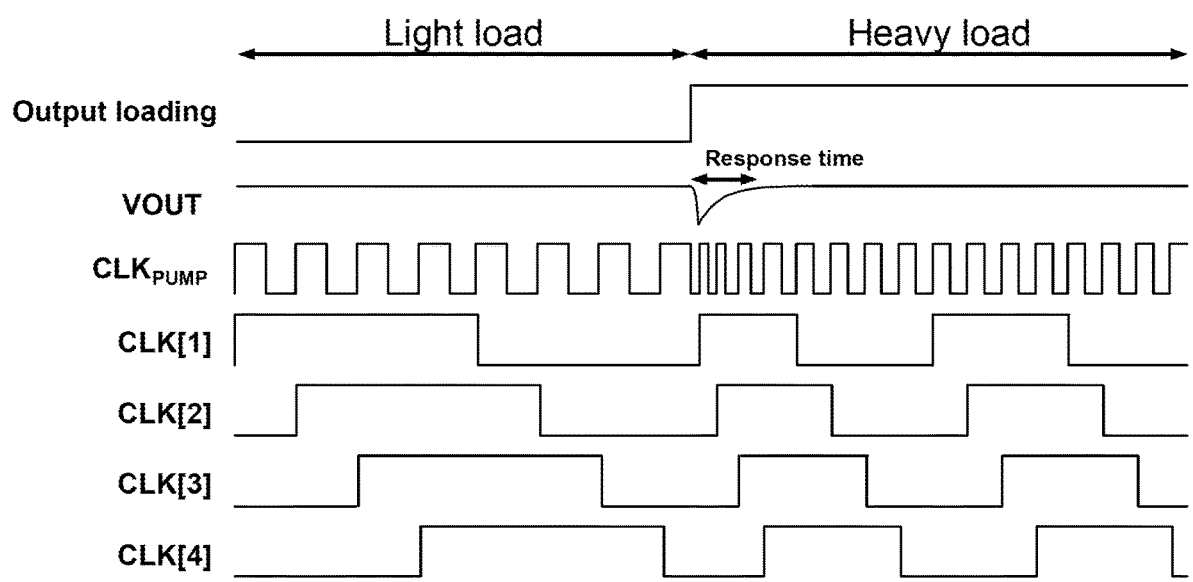
FIG. 12 shows waveforms of the operating signal and the control signal in FIG. 10.

Please refer to FIGS. 10 and 12. FIG. 12 shows waveforms of the operating signal and the control signal in FIG. 10. As shown in the figure, the operating signal $CLK_{PUMP}$ triggers one of the control signals CLK[1~N] to change the level to the high level by controlling the control terminals C of the flip-flops F[1~N]. Initially, the output terminals Q of the flip-flops F[1~N] output the pulse signals with low level. Then the inverse output terminal /Q of the last-stage flip-flop FN outputs the pulse signal with high level. Therefore, the input terminal D of the first-stage flip-flop F1 receives the high-level pulse signal output by the last-stage flip-flop FN. Afterwards, through the control of the operating signal $CLK_{PUMP}$, each flip-flop F[1~N] outputs the high-level pulse signal sequentially. For example, initially, the output terminals Q of the flip-flops F[1~N] output 0000; the inverse output terminal /Q of the last-stage flip-flop FN outputs 1. Next, the input terminal D of the first-stage flip-flop F1 receives 1. Thereby, as shown in FIG. 12, the output terminals Q of the four flip-flops are changed to 1000, 1100, 1110, 1111. At this moment, the inverse output terminal /Q of the last-stage flip-flop FN is 0. Thereby, the input terminal D of the first-stage flip-flop F1 receives 0, and the output terminals Q of the four flip-flops are changed to 0111, 0011, 0001, 0000.

Furthermore, given the state of the output loading is changed, the consumption rate of the electricity in the charge pump 12 is changes accordingly, and the operating frequency of the operating signal $CLK_{PUMP}$ is changed as well. Then the frequency of the control signals CLK[1~N] will be changed according to the operating frequency of the operating signal $CLK_{PUMP}$.

To sum up, the present invention discloses a charge pump, which comprises a power supply circuit and a frequency control circuit. The power supply circuit includes at least one electric energy storage element and charges the electric energy storage element for producing a supply voltage. The frequency control circuit is coupled to the electric energy storage element and outputs an operating signal to the power supply circuit. The frequency control circuit adjusts an operating frequency of the operating signal according to the electricity stored in the electric energy storage element for controlling the charging of the electric energy storage element and increasing the stored electricity.

The invention claimed is:

1. A charge pump, comprising:
   a power supply circuit, including at least one electric energy storage element, and charging said electric energy storage element for producing a supply voltage;
   a frequency control circuit, coupled to said electric energy storage element, outputting an operating signal to said power supply circuit, and adjusting an operating frequency of said operating signal according to the electricity stored in said electric energy storage element for controlling the charging of said electric energy storage element for increasing the stored electricity; and
   a voltage regulating circuit, including a first input terminal and a second input terminal, said first input terminal coupled to an output terminal of said charge pump, said second input terminal coupled to a reference voltage, said voltage regulating circuit generating a voltage regulating signal according to said supply voltage and said reference voltage, and said power supply circuit outputting said supply voltage according to said voltage regulating signal and the electricity of said electric energy storage element.

2. The charge pump of claim 1, wherein a charging frequency of said electric energy storage element is equal to said operating frequency.

3. The charge pump of claim 1, wherein said power supply circuit comprises:
   a switching circuit, coupled to said electric energy storage element, and turning on or turning off a charging path or a discharging path for said electric energy storage element.

4. The charge pump of claim 1, wherein said power supply circuit comprises:
   a detecting circuit, coupled to said frequency control circuit and a voltage regulating signal produced by a voltage regulating circuit, and detecting said voltage regulating signal for generating a detecting signal to said frequency control circuit; and wherein said frequency control circuit controls said operating frequency of said operating signal according to said detecting signal.

5. The charge pump of claim 1, wherein said electric energy storage element includes a first electrode terminal and a second electrode terminal; said first electrode terminal is coupled to a charging voltage and an output terminal of said power supply circuit via a switching circuit; said second electrode terminal is coupled to said switching circuit and said frequency control circuit and to a ground terminal via said switching circuit; and said power supply circuit stops outputting said supply voltage when said charging voltage charges said electric energy storage element.

6. The charge pump of claim 1, wherein said at least one electric energy storage element comprising:
   a first electric energy storage element, coupled to a charging voltage, a ground terminal, and an output terminal of said power supply circuit via a switching circuit; and
   a second electric energy storage element, coupled to said charging voltage, said ground terminal, and said output terminal of said power supply circuit via said switching circuit, said charging voltage charging said first electric energy storage element when said power supply circuit outputs said supply voltage by the electricity in said second electric energy storage element, and said charging voltage charging said second electric energy storage element when said power supply circuit outputs said supply voltage by the electricity in said first electric energy storage element.

7. The charge pump of claim 1, wherein said at least one electric energy storage element comprising:
   a first electric energy storage element, coupled to a charging voltage and a ground terminal via a switching circuit;
   a second electric energy storage element, coupled to said ground terminal, and an output terminal of said power supply circuit via said switching circuit;
   a third electric energy storage element, coupled to said ground terminal, and said output terminal of said power supply circuit via said switching circuit; and
   a fourth electric energy storage element, coupled to said charging voltage and said ground terminal via said switching circuit, said charging voltage charging said first electric energy storage element, and said third electric energy storage element and said fourth electric energy storage element being charged when said power supply circuit outputs said supply voltage by the electricity in said second electric energy storage element, and said first electric energy storage element charging said second electric energy storage element, and said charging voltage charging said fourth electric energy storage element when said power supply circuit outputs said supply voltage by the electricity in said third electric energy storage element.

8. The charge pump of claim 1, comprising:
   a clock generator, coupled to a comparator of said frequency control circuit, receiving a comparison signal, generating a plurality of switching signals according to said comparison signal, and coupled to said power supply circuit to output said switching signals to said power supply circuit for controlling the switching timing of said power supply circuit.

9. The charge pump of claim 1, wherein said frequency control circuit comprises:
   a comparator, coupled to a regulating threshold voltage and a voltage regulating signal generated by a voltage regulating circuit, comparing said regulating threshold voltage with said voltage regulating signal for generating a comparison signal, in which said frequency control circuit generates said operating signal according to said comparison signal, and said operating frequency is related to the frequency of said comparison signal.

10. The charge pump of claim 1, wherein said power supply circuit comprises:
    a plurality of charging circuits, coupled to a plurality of control signals and an output terminal of said power supply circuit, and producing a plurality of output voltages according to said control signals to product said supply voltage according to said output voltages; said charging circuits generates a plurality of detecting signals to said frequency control circuit; and said frequency control circuit modulates said control signals according to said detecting signals.

11. The charge pump of claim 1, wherein said frequency control circuit comprises:
    a plurality of flip-flops, including a plurality of input terminals, a plurality of output terminals, a plurality of inverse output terminals, and a plurality of control terminals; in which said input terminal of a first-stage flip-flop of said flip-flops is coupled to said inverse output terminal of a last-stage flip-flop of said flip-flops; said output terminals and said input terminals of said flip-flops between said first-stage flip-flop and said last-stage flip-flop are connected serially and sequentially; said control terminals are coupled to said operating signal; said operating signal controls said flip-flops to output a pulse signal to the flip-flop of the next stage sequentially; and said flip-flops generate a plurality of control signals according to the pulse signals.

* * * * *